No. 850,954. PATENTED APR. 23, 1907.
L. A. McLEAN.
CREAM SEPARATOR.
APPLICATION FILED DEC. 5, 1905.

Witnesses.
H. Dennison
W. C. Muir

Inventor.
L. A. McLean
by E. J. Fetherstonhaugh
Atty.

UNITED STATES PATENT OFFICE.

LAUCHLAN ALLAN McLEAN, OF TORONTO, ONTARIO, CANADA.

CREAM-SEPARATOR.

No. 850,954. Specification of Letters Patent. Patented April 23, 1907.

Application filed December 5, 1905. Serial No. 290,459.

*To all whom it may concern:*

Be it known that I, LAUCHLAN ALLAN MC-LEAN, of the city of Toronto, county of York, Province of Ontario, in the Dominion of Canada, have invented certain new and useful Improvements in Cream-Separators; and I do hereby declare that the following is a full, clear, and exact description of the same.

This invention relates to improvements in cream-separators as described in the present specification and set forth in the accompanying drawings, that form part of the same.

The invention consists, essentially, of a drag or step-box having a vertical orifice therethrough and holes in the wall thereof, a self-adjusting bearing member supported in said step-box, a tube having a beveled lower end extending into said bearing member and supporting a bowl, and a casing secured to the lower portion of said step-box.

The objects of the invention are to devise a drag on the separator which shall be free from lateral motion and whereby any wear in the bearing parts will be taken up automatically and the friction on the bowl minimized, and to provide a separator in which the parts may be readily removed and cleansed and at the same time durable.

Figure 1:
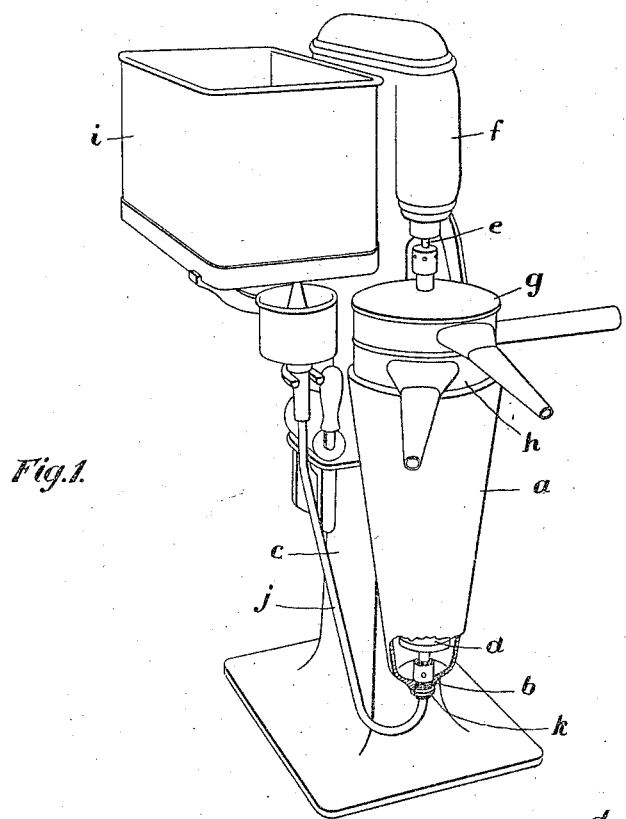
Figure 2:
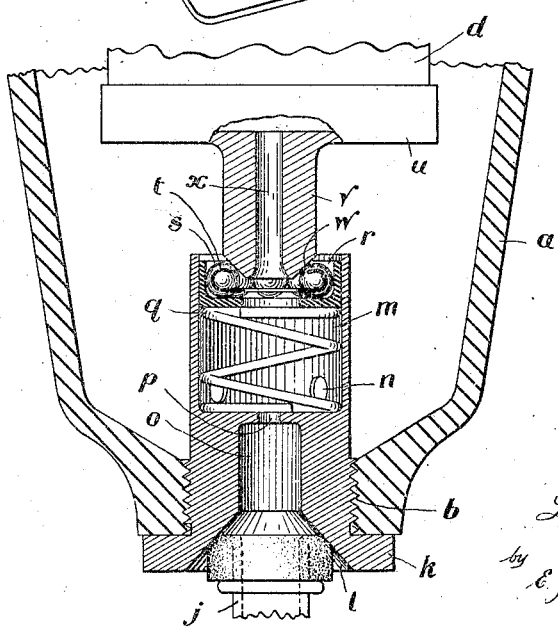

In the drawings, Figure 1 is a perspective view of a cream-separator, partially broken away, showing the invention applied thereto. Fig. 2 is an enlarged sectional detail through the drag portion, showing a portion of the bowl-casing.

Like letters of reference indicate corresponding parts in each figure.

Referring to the drawings, $a$ is the bowl-casing of the separator, which converges toward its lower end and has a threaded opening $b$ at its lower extremity. The casing $a$ forms part of or is attached to the main frame $c$ of the machine and has located in its interior a vertical tubular bowl $d$. The bowl $d$ is journaled at its upper end in suitable bearings and is rotated by the spindle $e$, which receives its motion from a suitable gearing inclosed in the casing $f$ of the machine.

$g$ and $h$ are the milk and cream covers, provided with discharge-spouts, and are located on the machine at the upper portion of the casing $a$.

$i$ is a feed-tank situated to the side of the casing $a$ and above the same and is connected by a feed-tube $j$, which carries the milk to the lower end of the casing $a$.

$k$ is the drag or step-box, which is threaded and screws into the threaded orifice $b$ in the lower extremity of the casing $a$. The drag $k$ has a tapered central orifice $l$, forming a nozzle, into which the end of the feed-tube $j$ extends.

$m$ is a cylindrical hollowed upper portion of the drag, having vent-holes $n$ in the walls thereof.

$o$ is a central cylindrical orifice leading vertically upward from the tapered orifice $l$ or nozzle portion of the drag and is reduced at $p$ to form a small opening through which the milk is forced upwardly in a small jet.

$q$ is a spiral spring which rests upon the bottom of the hollowed portion $m$ of the drag $k$.

$r$ is a cup forming a bearing member and having a central hole therethrough vertically in line with the reduced orifice $p$ to allow the jet of milk to pass freely in an upward direction. The cup $r$ is supported in the cylindrical hollowed portion $m$ of the step-box upon the spiral spring $q$ and has a vertical movement therein controlled by said spring.

$s$ are balls traveling in the ball-race formed by the cup $r$ and are retained in their relative positions by the retainer $t$.

$u$ is the base of the bowl $d$, having a suitable orifice leading therethrough. $v$ is a tube registering with said central orifice and secured to the base of the bowl and having a beveled lower edge $w$ journaled on the balls $s$.

It will be seen that as the tube $v$ is centrally located on the bowl and the ball-race $r$ is in central alinement with the said bowl the lower end of the bowl will be held by the balls in perfect central alinement and will effectually prevent any lateral motion while it is rotating.

The tube $v$ has a central vertical orifice $x$, which is flared outwardly at the lower end, so that the jet of milk passing upward from the orifice $o$ will pass freely through the orifice $x$ into the bowl.

The vertical tubular bowl $d$ is provided with the usual means for causing the separation of the milk and cream by the centrifugal action and is suitably connected at the upper portion to the covers $f$ and $g$, which carry the milk and cream from the machine.

As the appliances in the bowl and covers do not form a part of this invention, further description of these parts is eliminated.

In the operation of this machine the milk is placed in the feed-tank $i$ and passes from the said feed-tank through the feed-tube $j$ to the tapered orifice or nozzle *l*. The body of milk in the feed-tank and tube forces the milk upwardly through the reduced orifice *o* in the step-box and the orifice *x* in the spindle of the bowl. The force of the jet of milk passing upwardly into the bowl and the centrifugal action of the rotating bowl, aided by the apparatus contained therein, carries the milk to the upper portion of the said tubular bowl and during the passage separates the cream from the milk, the two portions passing outwardly through the spouts in the covers *g* and *h*.

With a drag or step-box such as described it will be readily seen that should there be any wear upon the upper bearings the spring *q*, pushing upwardly upon the ball-cup *r*, and consequently upon the bowl, through the ball-bearings, will automatically take up such wear or looseness, and as there is practically no wear in a ball-bearing all tendency to lateral motion of the bowl will be eliminated.

When it is desired to remove the parts of the machine for cleansing purposes, the covers *g* and *h* are removed and the bowl *d* lifted from the casing. The milk remaining in the bowl will drain through the holes *n* in the casing of the step-box. The ball-cup *q*, balls *r*, and spring *p* may then be lifted out of the hollow cylindrical portion *m* and properly cleansed. These parts are readily removed without having to unscrew any portion of the drag or step-box, and as they are all formed of metal there are no parts to retain any of the milk or cream which may have got into them.

What I claim as my invention is—

1. In a cream-separator, the combination with the bowl and feed-tank, of a step-box having a central vertical orifice therethrough and a cup-shaped recess extending downwardly from its upper end, said step-box being connected with said feed-tank and forming the passage for the fluid into said machine, a cushion-spring in said cup-shaped recess, a ring forming a ball-race supported on said spring, balls in said race, and a tube having its lower edge beveled and journaled on said balls and supporting said bowl, as and for the purpose specified.

2. In a cream-separator, the combination with the bowl and feed-tank, of a step-box having a central vertical orifice therethrough and a cup-shaped recess extending downwardly from its upper end and a plurality of vent-holes in the wall thereof at the bottom of said recess, said step-box being connected with said feed-tank and forming the passage for the fluid into said machine, a cushion-spring in said cup-shaped recess, a ring forming a ball-race supported on said spring, balls in said race, and a tube having its lower edge beveled and journaled on said balls and supporting said bowl, as and for the purpose specified.

Signed at Toronto this 22d day of November, 1905.

LAUCHLAN ALLAN McLEAN.

Witnesses:
H. DENNISON,
E. WILKIN.